US011113693B2

(12) United States Patent
Bermudez et al.

(10) Patent No.: US 11,113,693 B2
(45) Date of Patent: *Sep. 7, 2021

(54) SYSTEMS FOR DETECTING BIOMETRIC RESPONSE TO ATTEMPTS AT COERCION

(71) Applicant: Capital One Services, LLC, McLean, VA (US)

(72) Inventors: Sophie Bermudez, Dartmouth, MA (US); Alexandra Colevas, Arlington, VA (US); Sarah Cunningham, Arlington, VA (US); Michael Saia, New York, NY (US); Kaylyn Gibilterra, New York, NY (US); Salik Shah, Washington, DC (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,095

(22) Filed: Apr. 28, 2020

(65) Prior Publication Data
US 2020/0258088 A1 Aug. 13, 2020

Related U.S. Application Data

(63) Continuation of application No. 16/199,502, filed on Nov. 26, 2018, now Pat. No. 10,664,842.

(51) Int. Cl.
G06Q 20/10 (2012.01)
G06Q 20/40 (2012.01)
(Continued)

(52) U.S. Cl.
CPC ......... G06Q 20/4016 (2013.01); G06F 16/22 (2019.01); G06F 16/24575 (2019.01);
(Continued)

(58) Field of Classification Search
USPC ........................................................ 705/44
See application file for complete search history.

(56) References Cited

U.S. PATENT DOCUMENTS 5,615,277 A * 3/1997 Hoffman ............ G06K 9/00087
382/115
5,780,723 A 7/1998 Koo
(Continued)

OTHER PUBLICATIONS

FinCen, Advisory "Guidance on Recognizing Activityh that may be associated with Human Smuggling and Human Trafficing" (Year: 2014).*

(Continued)

Primary Examiner — Bruce I Ebersman
(74) Attorney, Agent, or Firm — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method providing biometric detection of coercion of a user. The system may detect a trigger event associated with a potential transfer of funds and may receive user biometric data. The system may determine, based on stored user biometric data and the detected user biometric data, a confidence level that the stored user biometric data is indicative of biological information representative of a user being in a stressed state. The system may initiate one or more precautionary safety measures.

19 Claims, 7 Drawing Sheets

(51) Int. Cl.
*G06F 16/22* (2019.01)
*G06F 16/2457* (2019.01)

(52) U.S. Cl.
CPC ........... *G06Q 20/10* (2013.01); *G06Q 20/407* (2013.01); *G06Q 20/40145* (2013.01)

(56) References Cited

U.S. PATENT DOCUMENTS

| | | | | |
|---|---|---|---|---|
| 5,870,723 | A * | 2/1999 | Pare, Jr. | G07F 7/1008 |
| | | | | 705/39 |
| 6,850,252 | B1 * | 2/2005 | Hoffberg | G06K 9/00369 |
| | | | | 348/E7.061 |
| 9,716,791 | B1 * | 7/2017 | Moran | H04L 65/1076 |
| 10,083,304 | B2 * | 9/2018 | Chhabra | G06F 21/53 |
| 2003/0154406 | A1 * | 8/2003 | Honarvar | G06Q 20/4014 |
| | | | | 726/10 |
| 2007/0250920 | A1 * | 10/2007 | Lindsay | G07F 7/1025 |
| | | | | 726/7 |
| 2009/0076966 | A1 * | 3/2009 | Bishop | G07F 7/0866 |
| | | | | 705/67 |
| 2010/0172567 | A1 * | 7/2010 | Prokoski | A61B 5/418 |
| | | | | 382/132 |
| 2015/0278977 | A1 * | 10/2015 | Roller | G06K 9/00288 |
| | | | | 705/325 |
| 2017/0135577 | A1 | 5/2017 | Komogortsev | |
| 2018/0068108 | A1 | 3/2018 | Fish et al. | |
| 2018/0174146 | A1 | 6/2018 | Bansal et al. | |

OTHER PUBLICATIONS

Sierra, et al., "Real-Time Stress Detection by Means of Physiological Signals," www.intechopen.com, pp. 1-23, Jun. 27, 2017.
Extended European Search Report in related Application No. 19207740.2, dated Mar. 31, 2020.
United States Dept. of the Treasury, "Advisory: Guidance on Recognizing Activity that May be Associated with Huamn Smuggling and Human Trafficking—Financial Red Flags," FIN-2014-A008, Sep. 11, 2014.

* cited by examiner

SYSTEMS FOR DETECTING BIOMETRIC RESPONSE TO ATTEMPTS AT COERCION

CROSS-REFERENCE TO RELATED APPLICATIONS

This application is a continuation of, and claims priority under 35 U.S.C. § 120 to, U.S. patent application Ser. No. 16/199,502, filed Nov. 26, 2018, the entire contents of which is fully incorporated herein by reference.

FIELD OF INVENTION

The present disclosure relates generally to biometric sensor-based detection of a stressed state of a user, and more particularly providing systems and methods for determining that a user is being coerced to transfer funds.

BACKGROUND

Mobile applications for banking, cryptocurrencies, and other technologies have become increasingly popular. Such technologies generally provide digital interfaces through which funds can be quickly and easily transferred between parties. Certain technologies, such as some cryptocurrency exchanges, may provide an environment in which funds can be easily transferred but cannot be easily tracked or refunded. In some such environments, it may be impossible to track or refund a transaction. Thus, some environments may permit a recipient of transferred funds to enjoy complete anonymity.

The availability of anonymity when receiving funds may provide certain persons a means by which those persons can coerce others into transferring funds. For example, a bad actor may forcibly coerce a person into transferring funds to a financial account accessible by the contemptible person, such as by forcing a person to transfer funds via a banking application installed on a mobile device. As another example, a bad actor may nonviolently coerce a person into transferring funds to another financial account, such as by blackmail. While the above examples include illegal acts of coercion, not all acts of coercion are so limited.

Accordingly, there is a need for improved devices, systems, and methods that can detect a trigger event and determine whether biometric data associated with a user is indicative of the user being in a stressed state. Such indication of a stressed state may suggest that the user is being coerced and may provide an opportunity to take precautionary safety measures, which may prevent or correct completion of a coerced transfer of funds and/or facilitate physical security of the user.

SUMMARY

Disclosed embodiments provide systems and methods for determining that a customer is being coerced to transfer funds.

Consistent with the disclosed embodiments, the system may include one or more memory devices storing instructions and one or more processors configured to execute the instructions to perform steps of determining an indication that a customer is being coerced to transfer funds. The system may execute the instructions to receive, from one or more sensors, biometric sensor data, the biometric sensor data being biological information representative of a user being in a stressed state and store the biometric sensor data via memory associated with the one or more processors. The system may detect, by the one or more processors, a trigger event that is associated with a potential transfer of funds, and responsive to detecting the trigger event, the system may receive, from the one or more sensors, situational data that includes biological information associated with the user. The system can determine, by the one or more processors, that the received situational data is above a predetermined level of similarity to the first biometric sensor data, and the system can initiate one or more precautionary safety measures.

Consistent with the disclosed embodiments, methods for detecting that a user is being coerced to transfer funds are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
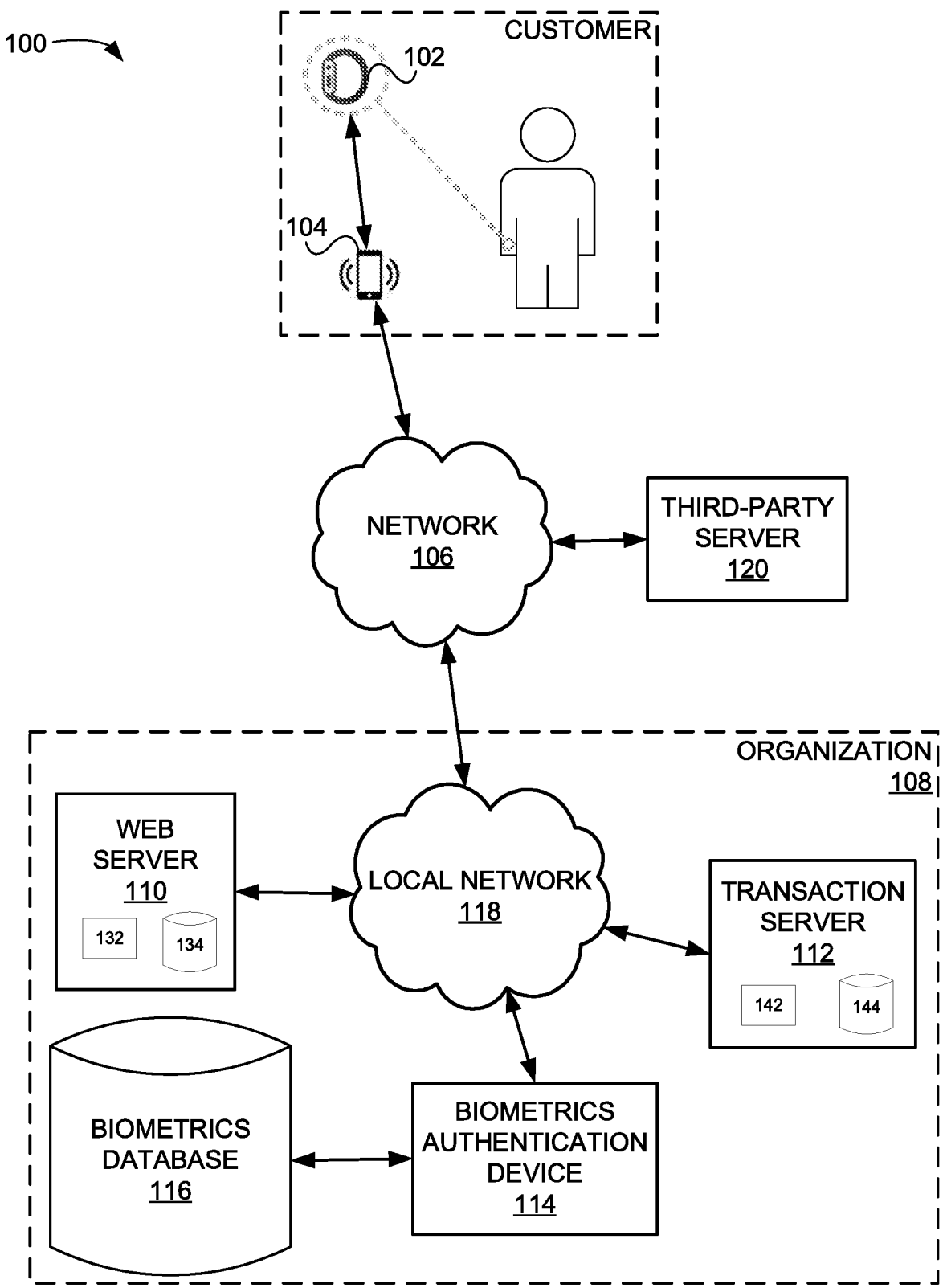
FIG. 1 is a diagram of an example coercion detection system, in accordance with some embodiments.

Throughout this disclosure, certain example embodiments are described in relation to systems and methods for determining that a customer is being coerced to transfer funds. embodiments of the disclosed technology are not so limited. In some embodiments, the disclosed technology may be effective in determining that a user is being coerced to perform any of a number of actions, such as transmitting a message, approving certain actions, or signing a contract. Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for determining that a user is being coerced to transfer funds. In some embodiments, the system may include one or more memory devices storing instructions and one or more processors configured to execute the instructions to perform steps of a method. Specifically, in some embodiments, the system may execute the instructions to receive, from one or more sensors, biometric sensor data. The biometric sensor data may include biological information representative of a user being in a stressed state. They system may store the biometric sensor data via memory associated with the one or more processors. The system may determine, by the one or more processors, that the received situational data is above a predetermined level of similarity to the first biometric sensor data, and the system may initiate one or more precautionary safety measures. In some embodiments, the system may initiate the one or more precautionary safety measures responsive to determining that the received situational data is above the predetermined level of similarity to the first biometric sensor data.

In some embodiments, a system for determining that a user is being coerced to transfer funds may include a non-transitory computer-readable medium storing instructions that, when executed by one or more processors, cause a system to perform steps of a method. Specifically, in some embodiments, the one or more processors may execute the instructions to receive first biometric sensor data from one or more sensors and may store the first biometric sensor data via memory associated with the one or more processors. The first biometric sensor data may be biological information representative of a user being in a stressed state. The one or more processors may also detect a trigger event; in some embodiments, the one or more processors may detect the trigger event by the one or more processors. The trigger event may be associated with a potential transfer of funds. Responsive to detecting the trigger event, the one or more processors may receive situational data from the one or more sensors. The situational data may include biological information associated with the user. The one or more processors may determine that the received situational data is above a predetermined level of similarity to the first biometric sensor data, and the system may initiate one or more precautionary safety measures.

In some embodiments, a method for determining that a user is being coerced to transfer funds is disclosed. The method may include detecting a trigger event. The trigger event may be associated with a potential transfer of funds. The method may include, responsive to detecting the trigger event, requesting user biometric data. The user biometric data may be indicative of biological information associated with the user. The method may include receiving the user biometric data and determining, based on a determination that the user biometric data is within a predetermined confidence threshold of similarity to stored user biometric data, that the stored user biometric data is indicative of biological information representative of the user being in a stressed state. The method may include receiving a request to transfer funds. The method may include transmitting, to a financial service provider, a notification that the requested transfer of funds was potentially coerced. The financial service provider may be associated with a recipient account associated with the rested transfer of funds. The method may include, subsequent to transmitting the notification, receiving a verification that the requested transfer of funds is a coerced transfer of funds. The method may include transmitting, to the financial service provider, a request to stop, cancel, and/or refund to a financial account associated with the user, the transfer of funds.

Although the above embodiments are described with respect to a system, a non-transitory computer-readable medium, and a method, it is contemplated that embodiments with identical or substantially similar features may alternatively be implemented as methods, systems, and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an example system 100 that may be configured to perform one or more processes that may determine whether a user is being coerced to transfer funds. The components and arrangements shown in FIG. 1 are not intended to limit the disclosed embodiments as the components used to implement the disclosed processes and features may vary. As shown, system 100 may include a wearable user device 102 and/or a user computing device 104, either of which may be connected to an organization 108 via a network 106. Organization 108 may include, for example, a web server 110, a transaction server 112, biometrics authentication device 114, a biometrics database 116, and a local network 118. In some embodiments, system 100 may include a third-party server 120, which may be connected to network 106.

According to some embodiments, organization 108 may be associated with an entity such as a business, corporation, individual, partnership, or any entity that may provide financial services or processing of financial transactions such as a bank, a credit card company, or the like. According to some embodiments, organization 108 may be associated with an entity that provides goods and services. According to some embodiments, third-party server 120 may be associated with an entity such as a business, corporation, individual, partnership, or any entity that may provide financial services or processing of financial transactions such as a bank, a credit card company, or the like. In some embodiments, merchant 107 and organization 108 may be associated with the same or related entities. Accordingly, although organization 108 and third-party server 120 are shown as being separate in FIG. 1, it should be understood that in some embodiments, some or all of the elements of organization 108 and third-party server 120 may be combined together into a single organization and/or into one or more components.

In some embodiments, a customer may operate wearable user device 102. User device 102 can include one or more of a wearable device such as a smart ring, a smart watch, a smart bracelet, smart glasses, smart clothing (e.g., a jacket or shirt having at least some of the electronics and/or operability discussed herein), or the like. In certain embodiments, the customer may operate a user computing device 104. User computing device may include one or more of a mobile device, smart phone, general purpose computer, tablet computer, laptop computer, telephone, a public switched telephone network (PSTN) landline, smart wearable device, voice command device, other mobile computing device, or any other device capable of communicating with network 106 and/or with one or more components of organization 108. According to some embodiments, some or all of the components and/or functionalities of user device 102 may be included in user computing device 104, and in some embodiments, some or all of the components and/or functionalities of computing device 104 may be included in user device 102. In certain embodiments, user device 102 and user computing device 104 may refer to the same device. User device 102 may belong to or be provided by the customer, or may be borrowed, rented, or shared. Users 101 may include individuals such as, for example, subscribers, clients, prospective clients, or customers of an entity associated with organization 108 and/or a third party, such as a third party associated with third-party server 120. According to some embodiments and as described more fully below, user device 102 and/or user computing device 104 may include one or more of: an environmental sensor for obtaining audio or visual data (e.g., a microphone and/or digital camera), one or more biometric sensors for obtaining biometric data from a user (e.g., heartrate data, blood pressure data, hormonal data, body temperature data, retinal data, iris data, voice data, respiratory data, brainwave data, olfactory data, sweat data), a geographic location sensor for determining the location of the device, an input/output device such as a transceiver for sending and receiving data (e.g., via Wi-Fi, cellular communications, near-filed communications, Bluetooth™, and the like), a display for displaying digital images, one or more processors, and a memory in communication with the one or more processors.

Figure 2:
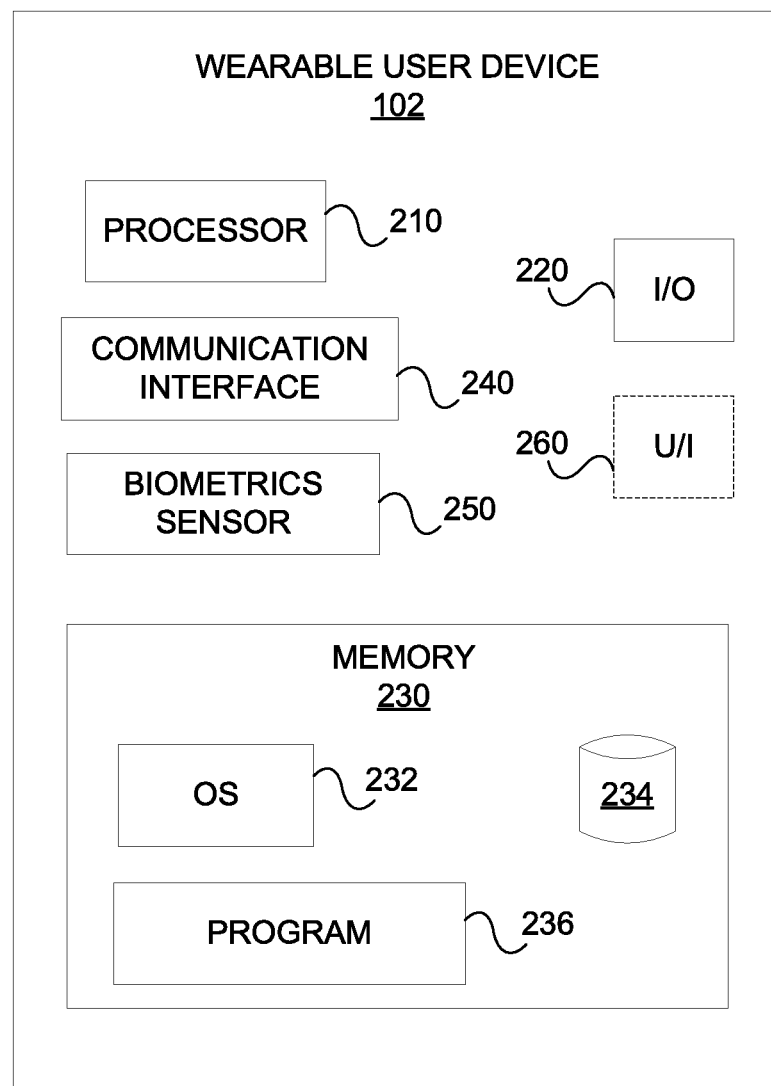
FIG. 2 is a component diagram of an example wearable user device, in accordance with some embodiments.

An example embodiment of wearable user device 102 is shown in more detail in FIG. 2. Wearable user device 102 may have a similar structure and components that are similar to those described with respect to user computing device 104. As shown, wearable user device 102 may include a processor 210; an input/output (I/O) device 220; a memory 230, which may contain an operating system (OS) 232, a storage device 234, which may be any suitable repository of data and may include a gesture database including data corresponding to one or more predetermined spatial gestures, and a program 236; a communication interface 240; and a biometrics sensor 250. In some embodiments, communication interface 240 may include a transceiver. In some embodiments, payor computing device 110 may further include a peripheral interface, a mobile network interface in communication with processor 210, a bus configured to facilitate communication between the various components of wearable user device 102, and/or a power source configured to power one or more components of wearable user device 102. In certain embodiments, wearable user device 102 may include a geographic location sensor (GLS) for determining the geographic location of wearable user device 102. In certain embodiments, wearable user device 102 may include a user interface (U/I) device 260 for receiving user input data, such as data representative of a click, a scroll, a tap, a press, a spatial gesture (e.g., as detected by one or more accelerometers and/or gyroscopes), or typing on an input device that can detect tactile inputs. In some embodiments, biometric sensor 250 may be one or more biometric sensors that are configured to detect and/or measure one or more types of biological information. For example, biometric sensor 250 may be configured to measure one or more of a user's heartrate, blood pressure, hormone levels, body temperature, ocular characteristics (e.g., size, shape, color, and/or other characteristics associated with a user's retina, iris, and/or pupil), voice, respiratory rate (e.g., breathing rate), brainwaves, odor (i.e., olfactory data), and sweat (e.g., amount produced, rate of production, molecular composition). Those having skill in the art will understand that the disclosed technology contemplates any and all sensors configured to measure biological information, including those not yet created, and is not restricted to those types of biological information expressly recited herein. In some embodiments, wearable user device 102 may include a microphone and/or an image capture device, such as a digital camera. In certain embodiments, wearable user device 104 may include one or more sensors configured to measure environmental data, such as ambient temperature (e.g., by a thermometer or thermocouple), ambient humidity (e.g., by a hygrometer), local wind speed (e.g., by an anemometer, manometer, or pressure transducer), or any other environmental data that may be useful for the methods and techniques disclosed herein.

In some embodiments, wearable user device 102 may include a peripheral interface, which may include the hardware, firmware, and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, Bluetooth™ low-energy (BLE) (e.g., BLE mesh and/or thread), Wi-Fi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public. A power source may be configured to provide an appropriate alternating current (AC) or direct current (DC) to power components.

As described above, wearable user device 102 may be configured to remotely communicate with one or more other devices, such as user computing device 104, organization 108, and/or third-party server 120. In some embodiments, wearable user device 102 may be configured to communication with one or more devices via network 106. According to some embodiments, wearable user device 102 may be configured to detect and transmit biometric data indicative of biological information associated with a user.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Memory 230 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and or other applications, as necessary), executable instructions and data. In some embodiments, processor 210 may include a secure microcontroller, which may be configured to transmit and/or facilitate payment transactions and/or cryptography. In some embodiments, processor 210 may comprise a single secure microcontroller configured to transmit and/or facilitate payment, encrypt and/or decrypt data, and/or process any other program instructions. In some embodiments, processor 210 may include one or more secure microcontrollers and/or other processing devices such that one or more secure microcontroller is configured to transmit and/or facilitate payment and/or encrypt and/or decrypt data, while one or more other processing device is configured to process any other program instructions. In some embodiments, some or all of the processing techniques described herein can be implemented as a combination of executable instructions and data within memory 230.

Processor 210 may be one or more known processing devices, such as a microprocessor from the Pentium™ family manufactured by Intel™, the Turion™ family manufactured by AMD™, or the Cortex™ family or SecurCore™ manufactured by ARM™. Processor 210 may constitute a single-core or multiple-core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Wearable user device 102 may include one or more storage devices 234 configured to store information used by processor 210 (or other components) to perform certain functions related to the disclosed embodiments. As an example, wearable user device 102 may include memory 230 that includes instructions to enable processor 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In some embodiments, wearable user device 102 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, wearable user device 102 may include memory 230 that may include one or more programs 236 to perform one or more functions of the disclosed embodiments. Moreover, processor 210 may execute one or more programs 236 located remotely from, for example and not limitation, web server 110, transaction server 112, or biometrics authentication device 114. For example, wearable user device 102 may access one or more remote programs 236, that, when executed, perform functions related to one or more disclosed embodiments. In some embodiments, one or more programs 236 may be configured to detect and/or measure biological information associated with a user, which may include, but is not limited to, a user's heartrate, blood pressure, hormone levels, body temperature, retina, iris, pupil, voice, respiratory rate (e.g., breathing rate), brainwaves, odor, and/or sweat. In some embodiments, the program(s) 236 may be configured to determine that the obtained biological information associated with the user is representative of the user being in a calm state or that the obtained biological information is representative of the user being in a stressed stated.

According to some embodiments, program(s) 236 may be configured to detect and/or obtain baseline biometric information associated with a user. In some embodiments, the baseline biometric data may include data representative of the user being in a calm state. In some embodiments, the baseline biometric data may include data representative of the user being in a stressed state. In some embodiments, the baseline biometric data may include a combination of data representative of the user being in a calm state (e.g., baseline calm biometric data) and data representative of the user being in a stressed state (e.g., baseline stressed biometric data). In some embodiments, the baseline calm biometric data and the baseline stressed biometric data may include the same types of biometric data (e.g., both include blood pressure data), and in some embodiments, the baseline calm biometric data and the baseline stressed biometric data may include different types of biometric data (e.g., the baseline calm biometric data includes blood pressure data but not heartrate data and the baseline stressed biometric data includes heartrate data but not blood pressure data). In certain embodiments, program(s) 236 may be configured to provide a request (e.g., audibly or via a display associated with wearable user device 102) for a user to provide baseline biometric data. In some embodiments, program(s) 236 may be configured to receive an indication from the user to begin recording biometric data that can be used as baseline biometric data. In some embodiments, program(s) 236 may request a certain type of baseline biometric data (e.g., calm or stressed), and in some embodiments, program(s) 236 may be configured to receive an indication from the user as to whether the biometric data being recorded is representative of the user being in a calm state or in a stressed state. According to some embodiments, program(s) 236 may be configured to record biometric data that can be used as baseline biometric data for a predetermined amount of time. For example, program(s) 236 may be configured to record biometric data for 1 minute, 5 minutes, 30 minutes, 1 hour, 2 hours, 1 day, or any amount of time desired, required, or deemed necessary to provide a sufficient amount of baseline data. In certain embodiments, program(s) 236 may be configured to record biometric data that can be used as baseline biometric data until indication from the user to stop recording has been received.

In some embodiments, program(s) 236 may be configured to determine, based on the recorded biometric data, a range of biometric data representative of the user being in a stressed state. In some embodiments, program(s) 236 may be configured to determine, based on the recorded biometric data, a range of biometric data representative of the user being in a calm state. In some embodiments, the range of stressed biometric data and/or the range of calm biometric data may be stored in storage device 234 or some other memory location (e.g., a memory location associated with user computing device 104 or in biometrics database 116).

In certain embodiments, program(s) 236 may be configured to update baseline biometric data on a regular or semi-regular basis. For example, program(s) 236 may be configured to measure, record, or otherwise obtain biometric data associated with the user on a daily, semi-daily, bi-daily, weekly, semi-weekly, bi-weekly, monthly, semi-monthly, bi-monthly, annual, or some other predetermined basis. As another example, program(s) 236 may be configured to measure, record, or otherwise obtain biometric data associated with the user whenever a certain event occurs, such as the user opening or logging into an application associated with program(s) 236 (such as an application associated with wearable user device 102 and/or user computing device 104).

In some embodiments, wearable user device 102 may determine one or more ranges of baseline biometric data (e.g., a range of baseline calm biometric data and/or a range of baseline stressed biometric data), which may be based at least in part on the obtained baseline biometric data. In some embodiments, wearable user device 102 may store the baseline biometric data and/or the one or more ranges of baseline biometric data locally. In some embodiments, wearable user device 102 may transmit the baseline biometric data such that it can be stored at memory associated with user computing device (e.g., storage location 334), at memory associated with organization 108 (e.g., biometrics database 116), or some other memory location. In some embodiments, wearable user device 102 may transmit the baseline biometric data such that user computing device 102, biometrics authentication device 114, or some other device or component can determine one or more ranges of baseline biometric data, which may be based at least in part on the obtained baseline biometric data. In certain embodiments, the baseline biometric data and/or ranges of baseline biometric data may be stored at multiple locations (e.g., multiple memory locations may store redundant copies of the baseline biometric data and/or ranges of baseline biometric data).

According to some embodiments, program(s) 236 may be configured to detect a trigger event. Program(s) 236 may be configured to detect a trigger event by receiving data indicative of one or more of the trigger events discussed herein. Such data may be received from one or more sensors or may be received within the program(s) 236 itself (e.g., by detecting that the user has opened the program(s) 236, such as a mobile banking application, and/or by detecting that the user has performed one or more certain actions within the program(s) 236). The trigger event may be any predetermined event or set of predetermined events. In some embodiments, the trigger event may be an event that must occur prior to a user transferring funds via one or more devices. For example, a user may desire to transfer funds via wearable user device 102 or user computing device 104, and to do so, a user is typically required to open or log into an application associated with wearable user device 102 or user computing device 104. Thus, in some embodiments, the trigger event may be a user opening or logging into an application, website, or other interface that can be used to transfer funds. In some embodiments, the trigger event may be opening or selecting a "transfer funds" function, tool, or window within the application or other interface (e.g., the user is already logged into an application or website associated with a financial service provider and a trigger event occurs when the user selects a "transfer funds" tool within the application or website). In certain embodiments, a trigger event may occur when the user attempts to access a financial service account associated with the user via an ATM or at a physical location or storefront. In some embodiments, a trigger event may occur when the user attempts to transfer money over a predetermined amount. In some embodiments, the predetermined amount may be configurable and/or customizable by a user, a financial service provider, or some other entity. In certain embodiments, a trigger event may be associated with a potential transfer of funds. In certain embodiments, a trigger event may occur if the user attempts to transfer funds to a financial account associated with a person or entity other than the user. In some embodiments, a trigger event may occur if the user attempts to transfer funds to a person or entity to whom the user has never before transferred funds or to whom the user has transferred funds below a predetermined number of times. In some embodiments, a trigger event may occur if the user attempts to transfer funds to a person or entity who is not associated with a "white list" of acceptable transfer recipients. In some embodiments, the "white list" may include accounts and/or persons or entities with whom the user has previously transferred funds. In some embodiments, a trigger event may occur if the user attempts to transfer funds to a person or entity who associated with a "black list" of acceptable transfer recipients. In some embodiments, a trigger event may occur if the user attempts to transfer funds to a person or entity who is a known criminal and/or has committed one or more predetermined actions. For example, in some embodiments, a trigger event may occur if the user attempts to transfer funds to a person or entity who has committed fraud, larceny, robbery, or any other predetermined crime or action. In some embodiments, a list of persons and/or entities who are criminals or have committed certain actions may be generated and maintained by organization 108 and may be saved in a database associated with organization 108. In certain embodiments, a list of persons and/or entities who are criminals or have committed certain actions may be generated and maintained by one or more third parties (e.g., one or more law enforcement agencies, one or more private entities) and may be accessible by organization 108.

In some embodiments, a trigger event may be based at least in part on a geographic location of wearable user device 102. For example, certain locations and/or certain area (e.g., geofenced areas) may be predetermined to be high-risk locations such that a trigger event may occur if the user opens a particular application or selects a certain tool while wearable user device 102 is located at a high-risk location or within a high-risk area. In certain embodiments, one or more high-risk locations may be based at least in part on publicly or commercially available information, such as overall crime rates, robbery rates, or other pertinent information. In some embodiments, one or more high-risk locations may be based on a history of locations visited by the user (e.g., as determined by a GLS associated with wearable user device 102 and/or user computing device 104). For example, in some embodiments, a trigger event may occur if the user opens a particular application or selects a certain tool while wearable user device 102 and/or user computing device 104 is located at a location or within an area that the wearable user device 102 has never before visited. In some embodiments, a trigger event may occur if the user opens a particular application or selects a certain tool while wearable user device 102 and/or user computing device 104 is located at a location or within an area that the wearable user device 102 does not regularly visit.

In some embodiments, certain locations and/or certain areas (e.g., geofenced areas) may be predetermined to be low-risk locations such that a trigger event will not occur if the user opens a particular application or selects a certain tool while wearable user device 102 is located at a low-risk location or within a low-risk area. In some embodiments, a trigger event may occur if the user opens a particular application or selects a certain tool while wearable user device 102 is not located at a low-risk location or is not within a low-risk area.

According to some embodiments, a trigger event may be based on a time of the day, day of the week, some other temporal characteristic, or any range or ranges thereof. In certain embodiments, this time or range of times may be configurable or customizable by the user, organization 108, or some other person or entity. In some embodiments, the time or range of times may be indicative of a time or range of times during which the user is unlikely to transfer funds. For example, in some embodiments, a trigger event may occur if the user opens a particular application, selects a certain tool, or performs some other predetermined action during a range of time, such as between 11 pm and 6 am. In some embodiments, a trigger event may occur based on a combination of one or more of the above discussed facts. For example, in some embodiments, a trigger event may not occur if the user opens a particular application at 2 am while wearable user device 102 is located at a location identified as the user's home, but a trigger event may occur if the user opens the application at 2 am while wearable user device is located at a location identified as an alley in a neighborhood with a crime rate above a predetermined threshold. As another example, a trigger event may not occur if the user attempts to transfer less than $500 while wearable user device 102 is located at a location identified as a workplace of the user, but a trigger event may occur if the user attempts to transfer more than $50 while wearable user device 102 is located at a location identified as a bar.

In some embodiments, wearable user device 102 (or user computing device 104, biometrics authentication device 114, or some other device or component) may be configured to request confirmation as to whether a trigger event was associated with a coerced transfer of funds (or an attempted coerced transfer of funds.

According to some embodiments, upon detecting a trigger event, program(s) 236 may be configured to detect and/or record biometric information associated with the user. In some embodiments, the detected and/or recorded biometric information may be referred to as situational biometric data. In some embodiments, the situational biometric data may include one or more of the types of biometric data included in the baseline biometric data. For example, situational biometric data may include one or more of images of the user (e.g., facial and/or body images), height, weight, heartrate data, blood pressure data, hormone level data, body temperature data, retina data, iris data, pupil data, voice data (e.g., tone, pitch, rate of speech, accent, etc.), respiratory rate data (e.g., breathing rate data), brainwave data, odor/scent data (i.e., olfactory data), and sweat data (e.g., amount produced, rate of production, molecular composition). In some embodiments, program(s) 236 may be configured to compare the situational biometric data to the baseline biometric data. In some embodiments, program(s) 236 may be configured to, based on the comparison, determine whether the situational biometric data is representative of the user being in a calm state or in a stressed state. For example, in some embodiments, if a comparison of the situational biometric data and the baseline biometric data representative of the user being in a calm state is above a predetermined threshold of similarity, program(s) 236 may determine that the situational biometric data is representative of the user being in a calm state. In some embodiments, if a comparison of the situational biometric data and the baseline biometric data representative of the user being in a calm state is below a predetermined threshold of similarity, program(s) 236 may determine that the situational biometric data is representative of the user being in a stressed state. In some embodiments, if a comparison of the situational biometric data and the baseline biometric data representative of the user being in a stressed state is above a predetermined threshold of similarity, program(s) 236 may determine that the situational biometric data is representative of the user being in a stressed state. In some embodiments, if a comparison of the situational biometric data and the baseline biometric data representative of the user being in a stressed state is below a predetermined threshold of similarity, program(s) 236 may determine that the situational biometric data is representative of the user being in a calm state. In some embodiments, program(s) 236 may be configured to transmit, to user computing device 104 or organization 108 (e.g., to biometrics authentication device 114), an indication that the situational biometric data is representative of the user being in a calm state or a stressed state.

As described above, situational biometric data may include one or several types of biometric data associated with the user (e.g., one or more of images of the user, heartrate data, blood pressure data, hormone level data, body temperature data, retina data, iris data, pupil data, various types of voice data (tone, pitch, rate of speech, accent, etc.), respiratory rate data, brainwave data, odor/scent data, and various types of sweat data (amount produced, rate of production, molecular composition, etc.). In some embodiments, program(s) 236 may be configured to determine whether one, some, or all of the measured types of biometric data is indicative of the user being in a stressed state. In some embodiments, program(s) 236 may be configured to require that two, three, four, five, six, seven, eight, nine, ten, or more of the measured types of biometric data is indicative of the user being in a stressed state in order for program(s) 236 to determine that the user is in a stressed state.

In some embodiments, program(s) 236 may be configured to determine whether a majority of the various types of biometric data measured support a determination of the user being in a stressed state. For example, if three types of biometric data are measured, program(s) may be configured to determine that a user is in a stressed state if two or more of the types of biometric data support this conclusion. As a more detailed example, program(s) 236 may be configured to compare situational biometric data A to baseline biometric data A (which is indicative of the user being in a stressed state), situational biometric data B to baseline biometric data B (which is indicative of the user being in a stressed state), and situational biometric data C to baseline biometric data C (which is indicative of the user being in a stressed state). If situational biometric data A is sufficiently similar to baseline biometric data A, but situational biometric data B and C are not sufficiently similar to baseline biometric data B and C, respectively, program(s) 236 may be configured to determine that the user is not in a stressed state. Conversely, if situational biometric data A is not sufficiently similar to baseline biometric data A, but situational biometric data B and C are sufficiently similar to baseline biometric data B and C, respectively, program(s) 236 may be configured to determine that the user is in a stressed state. Similarly, program(s) 236 may be configured to determine that a user is in a stressed state if a predetermined threshold percentage of types of measured biometric data is exceed. For example, in order for program(s) 236 to determine that the user is in a stressed state, some embodiments may require 40%, 50%, 67%, 75%, 80%, 90%, or 100% of the measured types of biometric data to be indicative (based on a comparison to corresponding types of baseline biometric data) of the user being in a stressed state.

According to some embodiments, program(s) 236 may be configured to compare one or more types of situational biometric data to one or more types of baseline biometric data. In certain embodiments, each of the various types of biometric data may be given an accuracy factor. That is, some types of biometric data may be deemed to more accurately indicate whether a user is undergoing stress, and an accuracy factor may permit program(s) 236 to more accurately determine whether a user is undergoing stress. For example, in some embodiments, four types of biometric data may be stored, and four respective types of situational biometric data (situational biometric data A-D). Program(s) 236 may determine that three of the four types of biometric data (situational biometric data A-C) are indicative of the user being in a calm state (or, minimally, not being in a stressed state), and program(s) 236 may determine that the remaining type of biometric data (situational biometric data D) is indicative of the user being in a stressed state. Nonetheless, program(s) 236 may determine that the user is in a stressed state if situational biometric data D has an accuracy factor that sufficiently outweighs the corresponding accuracy factors of situational biometric data A-C. That is, if the type of biometric data associated with situational biometric data D is deemed to closely and accurately correlate to a user's stressed state and the types of biometric data associated with situational biometric data A-C do not accurately correlate to a user's stressed state, program(s) 236 may be configured to more strongly weigh the situational biometric D when determining whether the user is in a stressed state.

In some embodiments, program(s) 236 may be configured to determine, based on the comparison, a stress value associated with the situational biometric data. For example, in some embodiments, program(s) 236 may be configured to determine a user's stress on a scale of 0 to 100, where 0 represents total calmness (i.e., no stress) and 100 represents total stress (i.e., no calmness). In some embodiments, program(s) 236 may be configured to determine if the situational biometric data has a stress value that is above a predetermined threshold (e.g., above 65 on a scale of 0 to 100). In certain embodiments, program(s) 236 may be configured to aggregate the stress value for all types of measured biometric data and determine if the aggregated stress value is above a predetermined threshold. In some embodiments, program(s) 236 may be configured to aggregate the stress value for all types of measured biometric data, divide the aggregated stress value by the number of types of measured biometric data to determine an average stress value, and determine if the average stress value is above a predetermined threshold. According to some embodiments, program(s) 236 may be configured to determine whether a user is in a stressed state using a weighted stress value (according to any of the methods described herein), where the stress value of each type of measured biometric data is multiplied by the corresponding accuracy factor for each type of measured biometric data.

In certain embodiments, program(s) 236 may not be configured to compare the situational biometric data to the baseline biometric data but may instead be configured to transmit the situational biometric data to user computing device 104 or organization 108 (e.g., to biometrics authentication device 114). In certain embodiments, program(s) 236 may be configured to transmit a location of the wearable user device 102 to user computing device 104 or organization 108 (e.g., to biometrics authentication device 114). In some embodiments, program(s) 236 may be configured to determine whether communication is established with user computing device 104 or organization 108 (e.g., to biometrics authentication device 114). In some embodiments, if communication is not established, program(s) 236 may be configured to save obtained situational biometric data on local memory (e.g., storage location 234). In some embodiments, program(s) 236 may be configured to determine that communication with user computing device 104 or organization 108 (e.g., to biometrics authentication device 114) has subsequently been established or re-established. In some embodiments, program(s) 236 may be configured to transmit the saved situational biometric data to user computing device 104 or organization 108 (e.g., to biometrics authentication device 114).

In certain embodiments, the program(s) 236 may be configured to detect and/or measure environmental data, which may include, but is not limited to, ambient temperature, ambient humidity, and/or local wind speed. In some embodiments, the program(s) 236 may be configured to determine whether the obtained biological information is representative of the user being in a calm state or a stressed stated based at least in part the obtained environmental data. For example, wearable user device 102 may determine that a user's body temperature is elevated and may also determine that the ambient temperature is 90° F.; accordingly, the program(s) 236 may determine that the elevated body temperature has little to no correlation to the user being in a stressed state. As an alternate example, wearable user device 102 may determine that a user's body temperature is elevated and may also determine that the ambient temperature is 40° F.; accordingly, the program(s) 236 may determine that the elevated body temperature has some level of correlation to the user being in a stressed state. In certain embodiments, wearable user device 102 may incorporate environmental data without measuring the data itself. For example, in some embodiments, wearable user device 102 may obtain local weather data or other environmental data from a publicly available or commercially available source of such information. While this may provide comparatively generalized or approximated information (as compared to information measured by wearable user device 102), this may also permit wearable user device 102 to require fewer components, which may provide a smaller, sleeker, and/or lighter wearable user device.

In some embodiments, wearable user device 102 may be configured to transmit situational biometric data, obtained environmental data, and/or data indicative of a determination that the user is in a calm state or a stressed state directly to the intended recipient, and in some embodiments wearable user device 102 may be configured to transmit situational biometric data, obtained environmental data, and/or data indicative of a determination that the user is in a calm state or a stressed state via one or more components, such as by user computing device 104 and/or network 106.

In some embodiments, responsive to a determination (by wearable user device 102, user computing device 104, or some other device or system, such as biometrics authentication device 114) that situational biometric data is indicative of the user being in a stressed state, program(s) 236 of wearable user device 102 (or program(s) 336 of user computing device or some other device or system, such as biometrics authentication device 114) may be configured to transmit a notification to the user. For example, the notification may include one or more of a phone call, an SMS message, and MMS message, an email, a voicemail, or any other type of message. In some embodiments, the notification may request confirmation that the user is physically unharmed and/or that the trigger event was associated with a coerced transfer of funds. In some embodiments, the notification may send to one or more third parties informing the third party that the user may be involved in a coerced transfer of funds. In certain embodiments, a third party may be a predetermined contact input by the user (e.g., an emergency contact). In some embodiments, the third party may be a law enforcement organization. In some embodiments, program(s) 236 (or some other device or system) may transmit instructions to a camera and/or a microphone (e.g., of wearable user device 102 or user computing device 104) to engage such that environmental data may be recorded. In some embodiments, program(s) 236 (or some other device or system) may be configured to determine from the recorded environmental data whether the user is in a potentially dangerous situation or is becoming victim to a coerced transfer of funds. In some embodiments, program(s) 236 (or some other device or system) may be configured to transmit the recorded environmental data to one or more security personnel who may review the recorded environmental data to determine whether the user is in a potentially dangerous situation or is becoming victim to a coerced transfer of funds. In some embodiments, responsive to determining that the situational data is above a predetermined level of stress for a predetermined amount of time, program(s) 236 (or some other device or system) may be configured to transmit a notification to one or more law enforcement organizations, and the notification may include a last-known location of the wearable user device 102 (and/or the user computing device 104).

In some embodiments, responsive to a determination that situational biometric data is indicative of the user being in a stressed state, program(s) 236 (or some other device or system) may be configured to request that the user look at the camera and/or recite a safe word or safe phrase. In some embodiments, the display of the wearable user device 102 or user computing device 104 may be configured to display a phrase, and the user may be requested to recite the displayed phrase. In certain embodiments, program(s) 236 (or some other device or system) may be configured to determine a secondary confirmation, based on a biometric analysis of the recording of the user's face and/or the recording of the user's voice, whether the situational data represents the user being in a stressed state.

In some embodiments, program(s) 236 (or some other device or system) may wait a predetermined amount of time to transmit a request to the user asking for confirmation as to whether the user has undergone a dangerous situation or has become victim to a coerced transfer of funds. This may permit a dangerous situation to conclude to avoid the transmission to the user unnecessarily escalating the dangerousness of the situation. In some embodiments, program(s) 236 (or some other device or system) may be configured to wait to contact the user until after biometric data of the user returns to a below a predetermined threshold stress or until the biometric of the user is within a predetermined degree of similarity to baseline biometric data that is indicative of the user being in a calm state. In some embodiments, program(s) 236 (or some other device or system) may be configured to determine that, upon detecting that a stress value associated with the user quickly decreases to zero (e.g., low stress value or no new biometric data of the user), the user is still in a stressed state, as the wearable user device 102 may have been removed from the user.

In some embodiments, program(s) 236 (or some other device or system) may be configured to determine may be configured to measure a body temperature data of the user. In some embodiments, body temperature data that is above or below a predetermined threshold may be indicative that the user is in a stressed state and/or is injured. For example, body temperature data below a predetermined threshold may be indicative of the user being injured, and body temperature data above a predetermined threshold may be indicative of the user being in a stressed state, or vice versa.

In certain embodiments, wearable user device 102 (or user computing device 104, biometrics authentication device 114, or some other device or component) may track past trigger events and whether those trigger events were confirmed by the user to be associated with a coerced transfer of funds or whether those trigger events were dismissed by the user as being a false positive and/or not associated with a coerced transfer of funds. In some embodiments, wearable user device 102 may update the "sensitivity" of future trigger events depending on the outcome of one or more past trigger events. For example, wearable user device 102 may dynamically change ranges of times associated with trigger events if a predetermined numbered of trigger events occurring within a certain time period have resulted in false positives. As another example, wearable user device 102 may add a new transfer recipient to the "white list" of approved recipients if a predetermined number of trigger events associated with a transfer of funds to that recipient have been dismissed by the user as a false positive. Those having skill in the art will recognize that other embodiments of machine learning and/or dynamically updating trigger events is herein contemplated.

Memory 230 may include one or more memory devices that store data and instructions used to perform one or more features of the disclosed embodiments. Memory 230 may also include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a baseline biometrics database including data for storing related data to wearable user device 102 to perform one or more of the processes and functionalities associated with the disclosed embodiments. The baseline biometrics database may include data corresponding to one or more types of biological information associated with the user that is representative of the user being in a calm state and/or one or more types of biological information associated with the user that is representative of the user being in a stressed state. In some embodiments, the baseline biometrics database may include default biometrics data that may be representative information that typically representative of a person being in calm state or a stressed state. While the use of default biometric data may permit the wearable user device to perform various operations and functionalities without requiring the user to provide baseline biometric data, determinations that the user is in a calm state or a stressed state that are based on the default biometric data may not be as accurate as determinations that are based on baseline biometric data specific to an individual user as biological responses to stress may vary from person to person.

In some embodiments, wearable user device 102 may be configured to determine whether wearable user device 102 is in communication range with (or that wearable user device does not have an established line of communication with) user computing device 104, network 106, or any other device or component. In some embodiments, upon determining that wearable user device 102 is not in communication range with, or does not have an established line of communication with, a particular device or component, wearable user device may be configured to save situational biometric data, obtained environmental data, and/or data indicative of a determination that the user is in a calm state or a stressed state in memory 230 (e.g., storage location 234) or some other storage location. In some embodiments, upon determining that wearable user device 102 has reestablished communication with the particular device or component, wearable user device 102 may be configured to transmit the stored biometric data, environmental data, and/or data indicative of a determination that the user is in a calm state or a stressed state.

Wearable user device 102 may also be communicatively connected to one or more memory devices (e.g., databases (not shown)) locally or through a network. The remote memory devices may be configured to store information and may be accessed and/or managed by wearable user device 102. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

In example embodiments of the disclosed technology, wearable user device 102 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While wearable user device 102 has been described as one form for implementing the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the wearable user device 102 may include a greater or lesser number of components than those illustrated. Some embodiments may exclude certain components discussed herein. For example, in certain embodiments, wearable user device 102 may not include an OS, depending on the complexity of the program instructions. Embodiments not including an OS may have comparative limited functionality but may also decrease power consumption of wearable user device 102. The various components of wearable user device 102 may include the same or similar attributes or capabilities of the same or similar components discussed with respect to user computing device 104.

Figure 3:
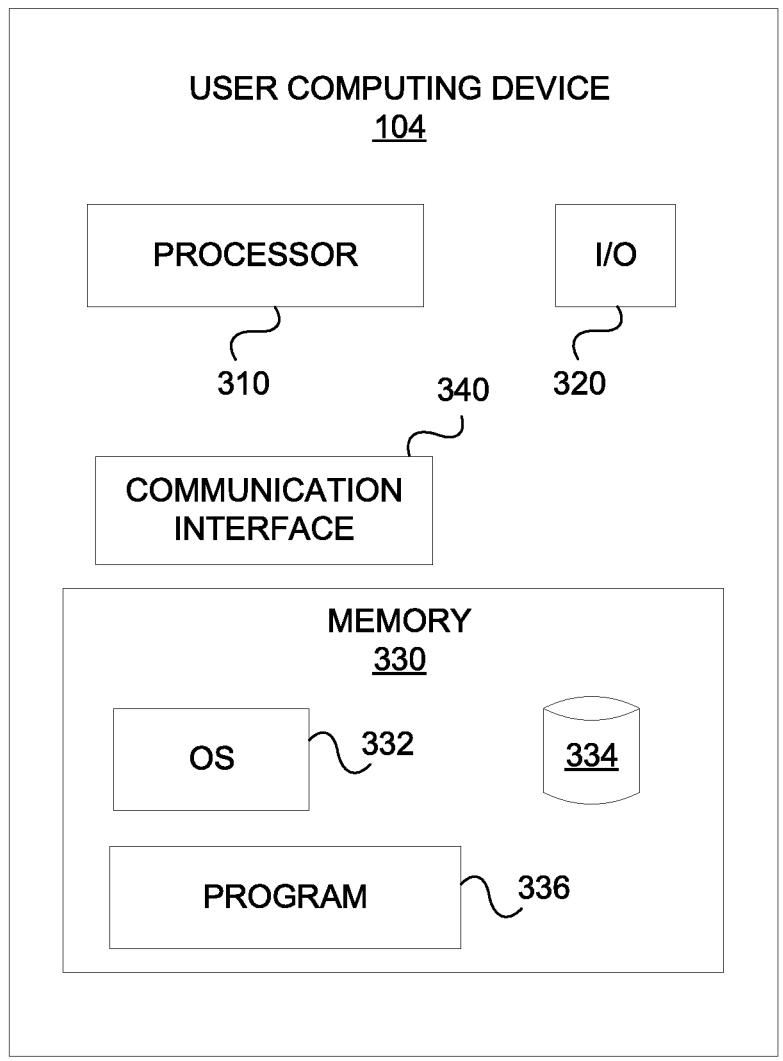
FIG. 3 is a component diagram of an example user computing device, in accordance with some embodiments.

An example embodiment of user computing device 104 is shown in more detail in FIG. 3. User computing device 104 may have a similar structure and components that are similar to those described with respect to wearable user device 102. As shown, user computing device 104 may include a processor 310; an I/O device 320; a memory 330 containing an OS 332, a storage device 334, which may be any suitable repository of data and may include a gesture database including data corresponding to one or more predetermined spatial gestures, and/or a program 336; and a communication interface 340. In some embodiments, user computing device 104 may include components such as an accelerometer; a gyroscope; a GLS for determining the geographic location of user computing device 104; a U/I device for receiving user input data; such as data representative of a click, a scroll, a tap, a press, or typing on an input device that can detect tactile inputs; a display; a microphone and/or an image capture device, such as a digital camera; one or more biometric sensors configured to measure biological information associated with a user such as one or more of a user's heartrate, blood pressure, hormone levels, body temperature, retina, iris, pupil, voice, respiratory rate (e.g., breathing rate), brainwaves, odor (i.e., olfactory data), and sweat (e.g., amount produced, rate of production, molecular composition); and/or one or more sensors configured to measure environmental data, such as ambient temperature (e.g., by a thermometer or thermocouple), ambient humidity (e.g., by a hygrometer), local wind speed (e.g., by an anemometer, manometer, or pressure transducer), or any other environmental data that may be useful for the methods and techniques disclosed herein. In some embodiments, communication interface 340 may include a transceiver. In some embodiments, user computing device 104 may further include a peripheral interface, a mobile network interface in communication with processor 310, a bus configured to facilitate communication between the various components of user computing device 104, and/or a power source configured to power one or more components of user computing device 104. The various components of user computing device 104 may include the same or similar attributes or capabilities of the same or similar components discussed with respect to wearable user device 102. In some embodiments, some or all of the functionalities discussed with respect to wearable user device 102 may be performed or accomplished by user computing device 104. For example, in some embodiments, storage device 334 may include some or all (or a copy of) baseline biometric data. As another example, in some embodiments, program(s) 336 of user computing device 104 may be configured to receive situational biometric data from wearable user device 102 and may be configured to determine, based on a comparison of the situational biometric data and the baseline biometric data, a stress value associated with the situational biometric data or that the situational biometric data is representative of the user being in a calm state or a stressed state. In some embodiments, user computing device 104 may serve as a communication relay. For example, in some embodiments, program(s) 336 may be configured to receive situational data from wearable user device 102 and may be configured to transmit the situational biometric data to organization 108

(e.g., biometrics authentication device 114) via network 106 or some other communication method.

In some embodiments, responsive to a determination that situational biometric data is sufficiently indicative of the user being in a stressed state, program(s) 336 of user computing device 104 may be configured to Network 106 may be of any suitable type, including individual connections via the internet such as cellular or Wi-Fi networks. In some embodiments, network 106 may connect terminals, services, and mobile devices using direct connections such as RFID, NFC, Bluetooth™, BLE, Wi-Fi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a PSTN and/or a wireless network.

Organization 108 may include one or more servers, devices, and computer systems for performing one or more functions associated with products and/or services that organization 108 provides. Such servers, devices, and computer systems may include, for example, web server 110, transaction server 112, biometrics authentication device 114, biometrics database 116, as well as any other computer systems necessary to accomplish tasks associated with organization 108 or the needs of customers (which may be customers of an entity associated with organization 108).

Transaction server 114 may include a computer system configured to process one or more transactions involving an account associated with a customer or user, or a request received from third party (e.g., an entity associated with third-party server 120) on behalf of a customer or user who is attempting to make a purchase. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with third-party server 120 and/or organization 108 provides to individuals such as customers. Transaction server 114 may have one or more processors 142 and one or more transaction server databases 144, which may be any suitable repository of transaction data. Information stored in transaction server 114 may be accessed (e.g., retrieved, updated, and added to) via local network 118 and/or network 106 by one or more devices.

In some embodiments, transaction server 114 tracks and stores event data regarding interactions between a third party, such as third-party server 120, with organization 108, on behalf of the individual (e.g., a customer or user). For example, transaction server 114 may track third-party interactions such as purchase requests, refund requests, warranty claims, account withdrawals and deposits, and any other type of interaction that third-party server 120 may conduct with organization 108 on behalf of an individual such as customer or user.

Local network 118 may comprise any type of computer networking arrangement used to exchange data in a localized area, such as Wi-Fi, Bluetooth™ Ethernet, and other suitable network connections that enable components of organization 108 to interact with one another and to connect to network 106 for interacting with components in system environment 100. In some embodiments, local network 118 may comprise an interface for communicating with or linking to network 106. In other embodiments, components of a third party (e.g., an entity associated with third-party server 120) and/or organization 108 may communicate via network 106, without a separate local network 118.

Figure 4:
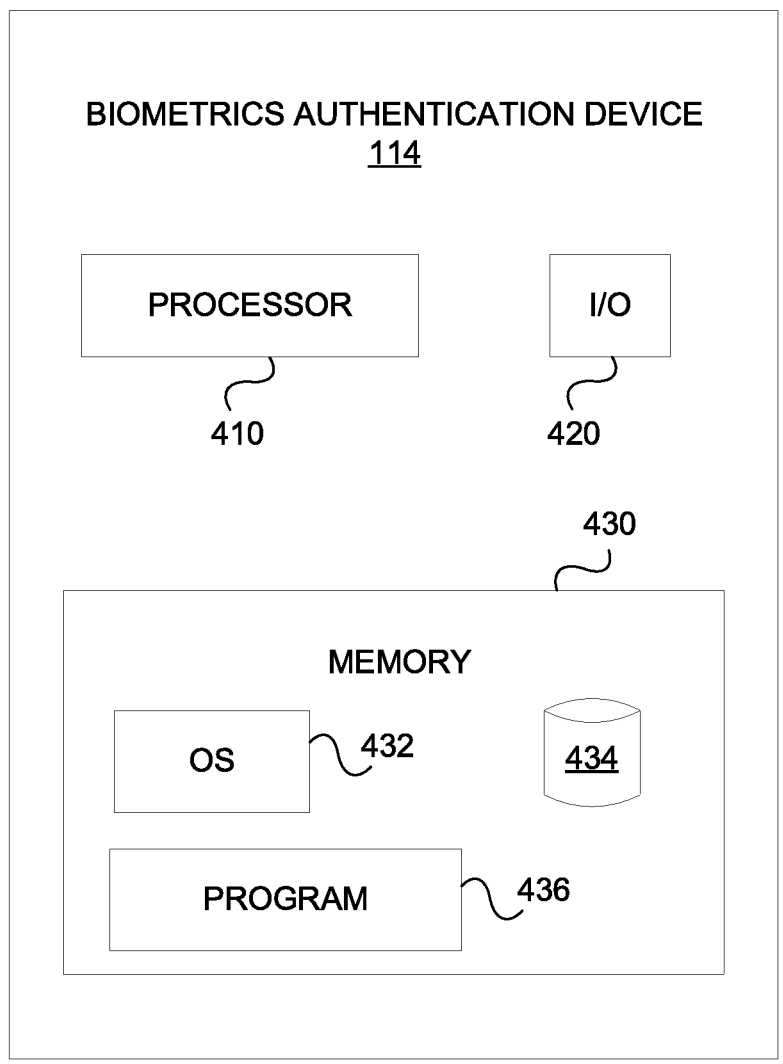
FIG. 4 is a component diagram of an example biometrics authentication device, in accordance with some embodiments.

An example embodiment of biometrics authentication device 114 is shown in more detail in FIG. 4. Biometrics authentication device 114 may have a similar structure and components that are similar to those described with respect to user computing device 104. As shown, biometrics authentication device 114 may include a processor 410; an I/O device 420; and a memory 430 containing an OS 432, a storage device 434, which may be any suitable repository of data and may include a gesture database including data corresponding to one or more predetermined spatial gestures, and/or a program 436. In some embodiments, biometrics authentication device 114 may include more or fewer components (e.g., the components described herein with respect to user computing device 104), and the various components of biometrics authentication device 114 may include the same or similar attributes or capabilities of the same or similar components discussed with respect to user computing device 104 and/or wearable user device 102.

Biometrics authentication device 114 may include a computer system configured to store, maintain, and update user biometric information. In some embodiments, biometrics authentication device 114 may store and/or maintain user biometric information in biometrics database 116. According to some embodiments, user biometric information may include biological information that may be representative of a particular user being in a calm state. In some embodiments, user biometric information may include biological information that may be representative of a particular user being in a stressed state. In some embodiments, biometrics authentication device 114 may include default biometric information, which may be based on an aggregation of all user biometric information stored in biometrics database 116 (i.e., biological information associated with a plurality of users) or a subset of the user biometric information stored in biometrics database 116.

In some embodiments, biometrics database 116 may include a user biometric profile, which may include biological information such as one or more of images of the user (e.g., facial and/or body images), height, weight, heartrate data, blood pressure data, hormone level data, body temperature data, retina data, iris data, pupil data, voice data (e.g., tone, pitch, rate of speech, accent, etc.), respiratory rate data (e.g., breathing rate data), brainwave data, odor/scent data (i.e., olfactory data), and sweat data (e.g., amount produced, rate of production, molecular composition). In certain embodiments, the user profile may include baseline biometric data representative of the user being in a calm state. In some embodiments, biometrics authentication device 114 may be configured to receive situational biometric data which may include biological information associated with the user. In certain embodiments, biometrics authentication device 114 may be configured to receive situational biometric data from wearable user device 102 and/or user computing device 104. In some embodiments, programs(s) 436 of biometrics authentication device 114 may be configured to compare situational biometric data (e.g., data obtained by wearable user device 102) to the user profile and may be configured to determine whether the situational biometric data is representative of the user being in a calm state or a stressed state and/or to determine whether a stress value is above a predetermined threshold. For example, if a comparison of the situational biometric data and the baseline biometric data (i.e., data representative of the user being in a calm state) is above a predetermined threshold of similarity, the biometrics authentication device 114 may determine that the situational biometric data is representative of the user being in a calm state (or a likelihood of coercion is below a predetermined threshold or a likelihood of coercion is below a predetermined threshold). Alternately, if a comparison of the situational biometric data and the baseline biometric data (i.e., data representative of the user being in a calm state) is below a predetermined threshold of similarity, the biometrics authentication device 114 may determine that the situational biometric data is representative of the user being in a stressed state (or a stress value is above a predetermined threshold or a likelihood of coercion is above a predetermined threshold).

In certain embodiments, the user biometric profile may include baseline biometric data representative of the user being in a stressed state. In some embodiments, if a comparison of the situational biometric data and the baseline biometric data (i.e., data representative of the user being in a stressed state) is above a predetermined threshold of similarity, the biometrics authentication device 114 may determine that the situational biometric data is representative of the user being in a stressed state (or a stress value is above a predetermined threshold or a likelihood of coercion is above a predetermined threshold). Alternately, in some embodiments, if a comparison of the situational biometric data and the baseline biometric data (i.e., data representative of the user being in a stressed state) is below a predetermined threshold of similarity, the biometrics authentication device 114 may determine that the situational biometric data is representative of the user being in a calm state (or a stress value is below a predetermined threshold or a likelihood of coercion is below a predetermined threshold).

In some embodiments, the user biometric profile may include baseline calm biometric data (i.e., data representative of the user being in a calm state) and baseline stressed biometric data (i.e., data representative of the user being in a stressed state). In some embodiments, the baseline calm biometric data and the baseline stressed biometric data may include the same types of biometric data (e.g., both include blood pressure data), and in some embodiments, the baseline calm biometric data and the baseline stressed biometric data may include different types of biometric data (e.g., the baseline calm biometric data includes blood pressure data but not heartrate data and the baseline stressed biometric data includes heartrate data but not blood pressure data).

In some embodiments, biometrics authentication device 114 may determine that the situational biometric data is representative of the user being in a calm state if a comparison of the situational biometric data and the baseline calm biometric data is above a predetermined threshold of similarity and/or if a comparison of the situational biometric data and the baseline stressed biometric data is below a predetermined threshold of similarity. In some embodiments, the biometrics authentication device 114 may determine that the situational biometric data is representative of the user being in a stressed state if a comparison of the situational biometric data and the baseline stressed biometric data is above a predetermined threshold of similarity and/or if a comparison of the situational biometric data and the baseline calm biometric data is below a predetermined threshold of similarity.

In some embodiments, biometrics authentication device 114 may receive an indication that the user has initiated a transfer of funds or requested a transfer or funds (e.g., via wearable user device 102, user computing device 104, or some other device or component). In some embodiments, biometrics authentication device 104 may initiate one or more safety measures. In some embodiments, the safety measures include a request for the user to confirm the status of the request to transfer funds (e.g., indicate whether the transfer of funds was coerced or whether the user requested the transfer of funds under the user's own volition). In certain embodiments, the request for the user to confirm the status of the request to transfer funds may include one or more of a phone call, an SMS message, and MMS message, an email, a voicemail, or any other type of message. In some embodiments, the notification may request confirmation that the user is physically unharmed and/or that the trigger event was associated with a coerced transfer of funds. In some embodiments, the notification may send to one or more third parties (e.g., an emergency contact) informing the third party that the user may be involved in a coerced transfer of funds. In some embodiments, the third party may be a law enforcement organization, and in some embodiments, the notification may include a last-known location of the wearable user device 102 (and/or the user computing device 104). In some embodiments, biometrics authentication device 114 may transmit instructions to a camera and/or a microphone (e.g., of wearable user device 102 or user computing device 104) to engage such that environmental data may be recorded. In some embodiments, biometrics authentication device 114 may be configured to determine from the recorded environmental data whether the user is in a potentially dangerous situation or is becoming victim to a coerced transfer of funds. In some embodiments, biometrics authentication device 114 may be configured to transmit the recorded environmental data to one or more security personnel who may review the recorded environmental data to determine whether the user is in a potentially dangerous situation or is becoming victim to a coerced transfer of funds.

In some embodiments, biometrics authentication device 114 may be configured to transmit an artificial confirmation notification to a financial service provider or other third party associated with a receiving account that is associated with a potentially coerced transfer of funds. In some embodiments, the artificial confirmation notification may indicate that the transfer of funds has successfully deposited funds into the receiving account. In some embodiments, if the user indicates that the transfer of funds was not coerced, biometrics authentication device 114 may be configured to deposit the funds into the receiving account. In certain embodiments, if the user indicates that the transfer of funds was coerced, biometrics authentication device 114 may be configured to cancel the transfer of funds such that the funds are not deposited into the receiving account. According to some embodiments, biometrics authentication device 114 may also notify a law enforcement organization and/or the financial service provider or third party associated with the receiving account such that the holder of receiving account may be identified as being accused of coercing a transfer of funds. In certain embodiments, biometrics authentication device 114 may be configured to complete a transfer of funds to the financial service provider associated with the receiving party such that the funds are temporarily held by the financial service provider in a holding account. Upon confirmation that the transfer of funds was not coerced, biometrics authentication device 114 may instruct the financial service provider to complete the transfer by transferring the funds from the holding account to the receiving account. Upon confirmation that the transfer of funds was coerced, biometrics authentication device 114 may instruct the financial service provider to cancel the transfer and refunds the transferred funds to an account associated with the user. In some embodiments, upon confirmation that the transfer of funds was coerced, biometrics authentication device 114 may instruct the financial service provider to freeze the receiving account.

According to some embodiments, the system (e.g., wearable user device 102, user computing device 104, or biometrics authentication device 114) may be configured to determine one or more safety measures dependent on a risk rating associated with a trigger event. For example, some embodiments may include a first tier of precautionary safety measures, which corresponds to a low risk rating associated with the trigger event, and some embodiments may include a second tier of precautionary safety measures, which corresponds to a high risk rating associated with the trigger event. In some embodiments, biometrics authentication device 114 may determine that a risk rating associated with the trigger event and/or situational data. The risk rating may be based at least in part on level of stress indicated by the situational data (e.g., how extreme the level of stress or level of calmness is). In some embodiments, the risk rating may be determined according to particular areas, the various crime rates associated with those particular areas, and whether the user or other users have been coerced to transfer funds in that area. The risk rating may also be based at least in part on time of day or other factors discussed herein with respect to detection of a trigger event. In some embodiments, the first tier (i.e., low risk tier) may correspond to less severe safety measures as compared to safety measures corresponding to the second tier (i.e., high risk tier). For example, in some embodiments, the first tier may comprise sending a push notification requesting that the user indicate whether a transfer is being coerced, and in some embodiments, the second tier may comprise recording environmental data without providing a notification to the user.

Although the preceding description describes various functions of wearable user device 102, user computing device 104, web server 110, transaction server 112, biometrics authentication device 114, biometrics database 116, and third-party server 120, in some embodiments, some or all of these functions may be carried out by a single computing device. For example, although FIG. 1 depicts authentication device 120 as being present in organization 108, in some embodiments, some or all of the functionalities of authentication device 120 may be carried out by wearable user device 102 and/or user computing device 104.

Figure 5:
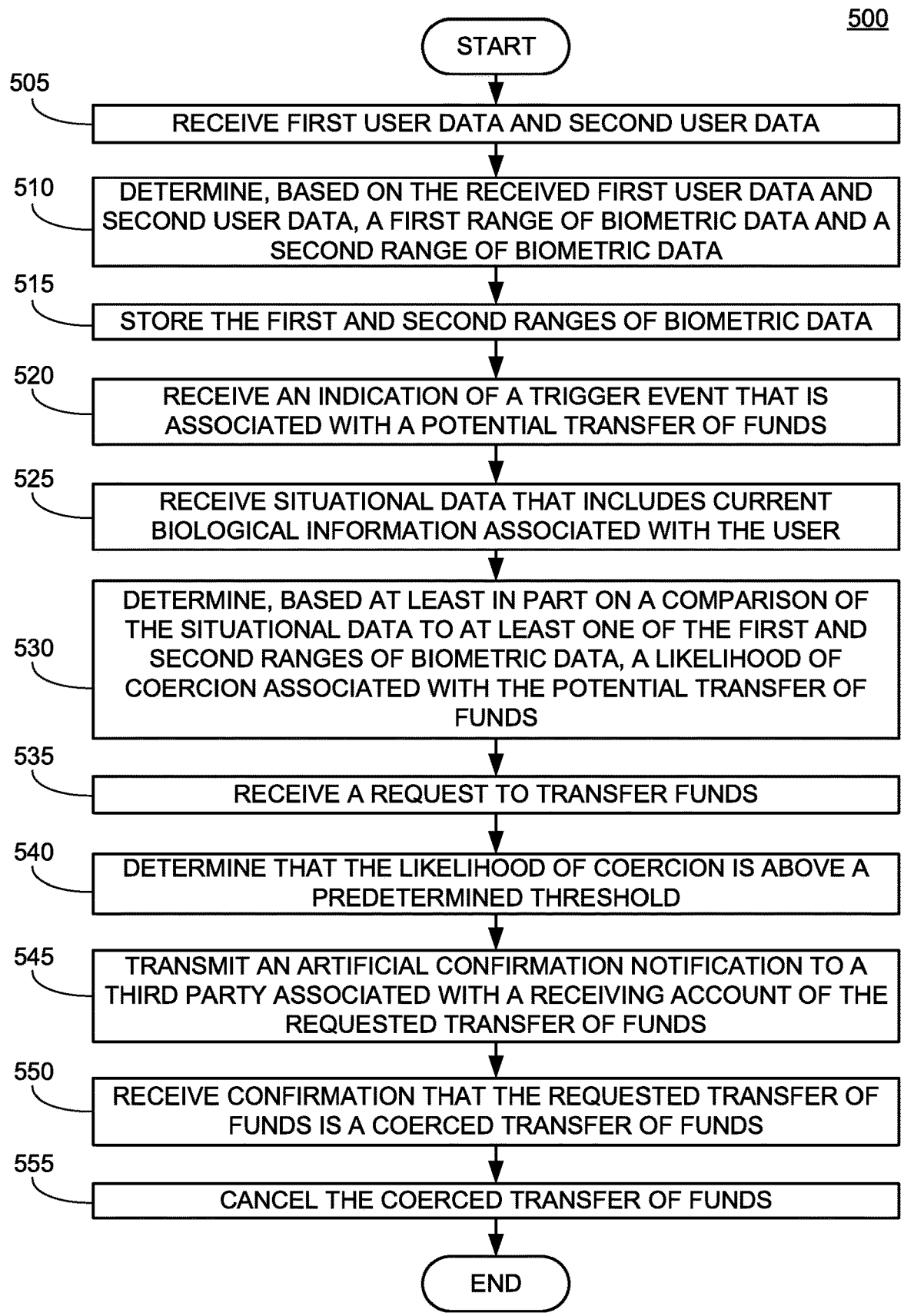
FIG. 5 is a flowchart showing operation of an example coercion detection system, in accordance with some embodiments.

FIG. 5 shows a flowchart of a method 500 for determining whether a user is being coerced to transfer funds. Method 500 may be performed by some or all of wearable user device 102, user computing device 104, web server 110, transaction server 112, biometrics authentication device 114, biometrics database 116, and third-party server 120, or any useful combination thereof.

In block 505, method 500 (e.g., wearable user device 102, user computing device 104, and/or biometrics authentication device 114) may include receiving first user data and second user data. The user data may comprise biometric data, and in some embodiments, the first user data may be indicative of biological information representative of the user being in a calm state, and the second user data may be indicative of biological information representative of the user being in a stressed state. In block 510, method 500 may include determining a first range of biometric data based on the first user data and/or the second user data, and method 500 may include determining a second range of biometric data based on the first user data and/or the second user data. In some embodiments, the first user data may include a range of values indicative of a predetermined confidence level that biometric data falling within that range of values is indicative of the user being in a calm state. In some embodiments, the second user data may include a range of values indicative of a predetermined confidence level that biometric data falling within that range of values is indicative of the user being in a stressed state. In block 515, method 500 may include storing the first and second ranges of biometric data in memory (e.g., one or more of storage device 234, storage device 334, or storage device 434).

In block 520, method 500 may include receiving an indication of a trigger event, as discussed above. The trigger event may be associated with a potential transfer of funds (e.g., the opening of a mobile banking application on user computing device 104). In block 525, method 500 may include receiving situational data. In some embodiments, the situational data may include biological information (e.g., biometric information) associated with the user. In some embodiments, the situational data may be a stream of biological information associated with the user. In certain embodiments, the situational data may include current (e.g., real-time or near real-time) biological information associated with the user. In certain embodiments, the situational data may be a continuous stream of data, and in some embodiments, the situational data may include transmissions of data that occur at a predetermined interval.

In block 530, method 500 may include determining, based at least in part on a comparison of the situational data to the first range of biometric data and/or the second range of biometric data, a likelihood of coercion associated with the potential transfer of funds. In certain embodiments, the likelihood of coercion may correspond to a stress value, a stress value, or similar data. In block 535, method 500 may include receiving, from the user (e.g., via wearable user device 102 or user computing device 104), a request to transfer funds, and in block 540, the system may be configured to determine that the likelihood of coercion is above a predetermined threshold. In certain embodiments, the predetermined threshold may be selected by the user, by an entity associated with the system, or dynamically (e.g., autonomously by the system). In some embodiments, method 500 may include dynamically selecting the predetermined threshold, which may be based on various types of historical data, such as previous instances of the user being coerced to transfer funds, information associated with the circumstances surrounding previous instances of the user being coerced to transfer funds (e.g., location, time, crime rate of location), and/or false positives.

In block 540, method 500 may include transmitting an artificial notification to a third party (e.g., the party potentially coercing the transfer of funds) associated with a receiving account of the requested transfer of funds. According to some embodiments, this may include transmitting a temporary transfer of funds to a financial service provider associated with the receiving account such that the financial service provider is enabled to transmit, to the third party, an indication of a completed transfer of funds without the funds having been actually transferred into the receiving account. In some embodiments, method 500 may alternately include transmitting a flagged transfer of funds such that the financial service provider associated with the transfer of funds may track, investigate, or otherwise be apprised of the fact that the corresponding transfer of funds may have been coerced by the third party associated with the receiving account. According to various embodiments described herein, this may lead the third party to believe that the coerced transfer of funds has been successfully completed such that the third party leaves the user without further incident. Thus, method 500 may facilitate a safe resolution to a situation in which the third party attempts to coerce a transfer of funds from an account associated with the user to the receiving account associated with the third party.

In block 550, method 500 may include receiving (e.g., from the user via wearable user device 102 or via user computing device 104) confirmation that the requested transfer of funds is a coerced transfer of funds. In block 555, method 500 may include canceling the coerced transfer of funds. In some embodiments, method 500 may include transmitting, to the financial service provider associated with the receiving account, instructions to stop, cancel, and/or refund the transfer of funds. In some embodiments, the refunded funds may be transferred back to the financial account associated with the user.

Figure 6:
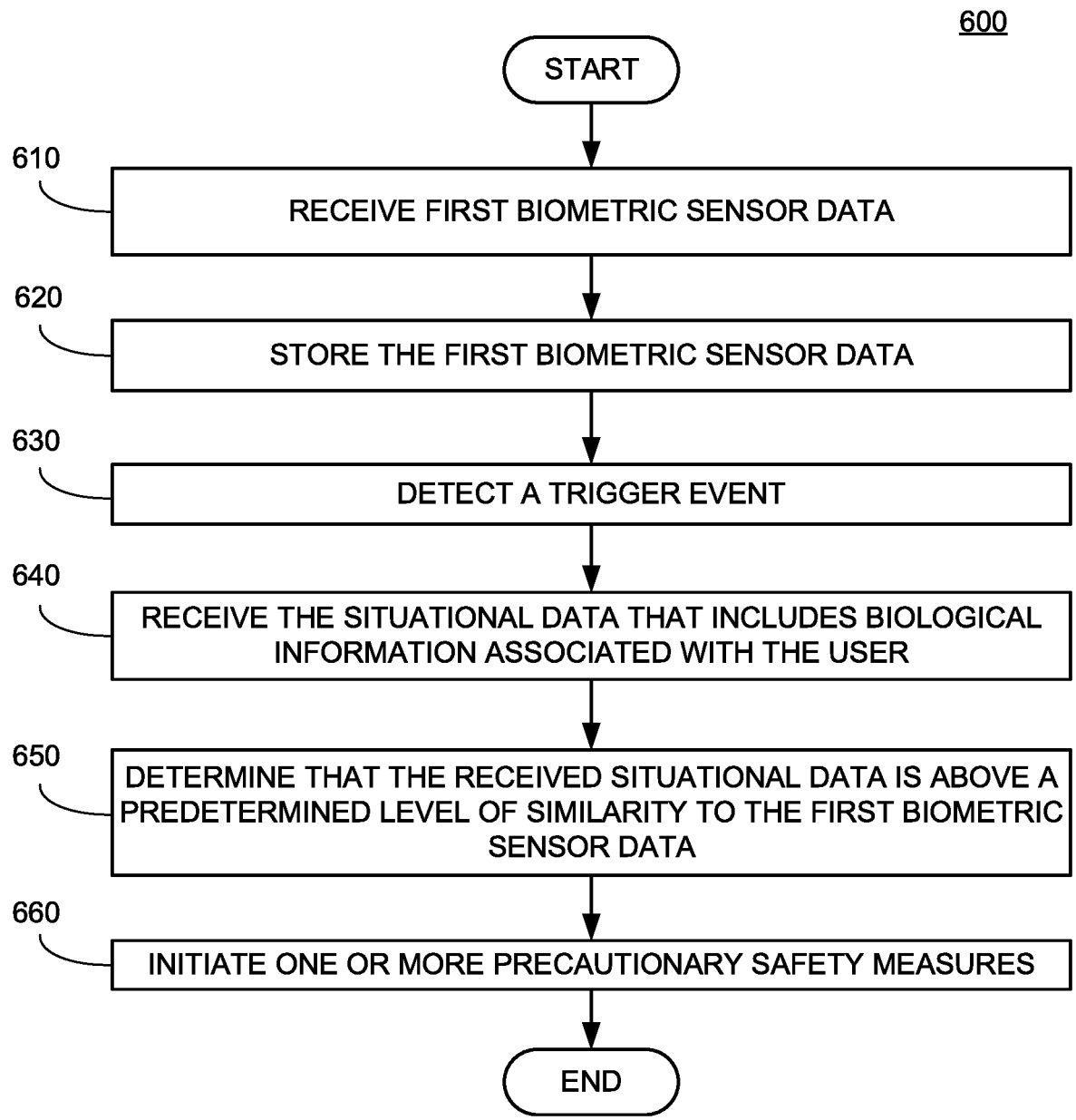
FIG. 6 is a flowchart showing operation of an example coercion detection system, in accordance with some embodiments.

FIG. 6 shows a flowchart of a method 600 for determining whether a user is being coerced to transfer funds. Method 600 may be performed by some or all of wearable user device 102, user computing device 104, web server 110, transaction server 112, biometrics authentication device 114, biometrics database 116, and third-party server 120, or any useful combination thereof.

In block 610, method 600 may include receiving (e.g., by wearable user device 102 or user computing device 104) first biometric sensor data, and in block 620, method 600 may include storing the first biometric sensor data in memory (e.g., storage device 234, storage device 334, storage device 434). In block 630, method 600 may include detecting a trigger event, as described herein. In block 640, method 600 may include receiving situational data, and in some embodiments, the situational data may include biological information associated with the user. As discussed with respect to block 525 of method 500, receipt of the situational data may be continuous (e.g., a stream of data) for a duration of time following the trigger event, and in some embodiments, receipt of the situational data may occur at predetermined intervals. In some embodiments, method 600 may include receiving the situational data until the situational data is indicative of a stress value of the user falling below a predetermined level. In some embodiments, method 600 may include receiving situational data in response to detecting a trigger event.

In block 650, method 600 may include determining that the received situational data is above a predetermined level of similarity to the first biometric sensor data. That is, method 600 may include determining that the received situational data is representative of the user being in a stressed state or corresponds to a stress value that is above a predetermined threshold or corresponds to a likelihood of coercion that is above a predetermined threshold. In some embodiments, method 600 may include initiating one or more precautionary safety measures, as described herein. In certain embodiments, method 600 may include initiating one or more precautionary safety measures in response to determining that the received situational data is above a predetermined level of similarity to the first biometric sensor data.

Figure 7:
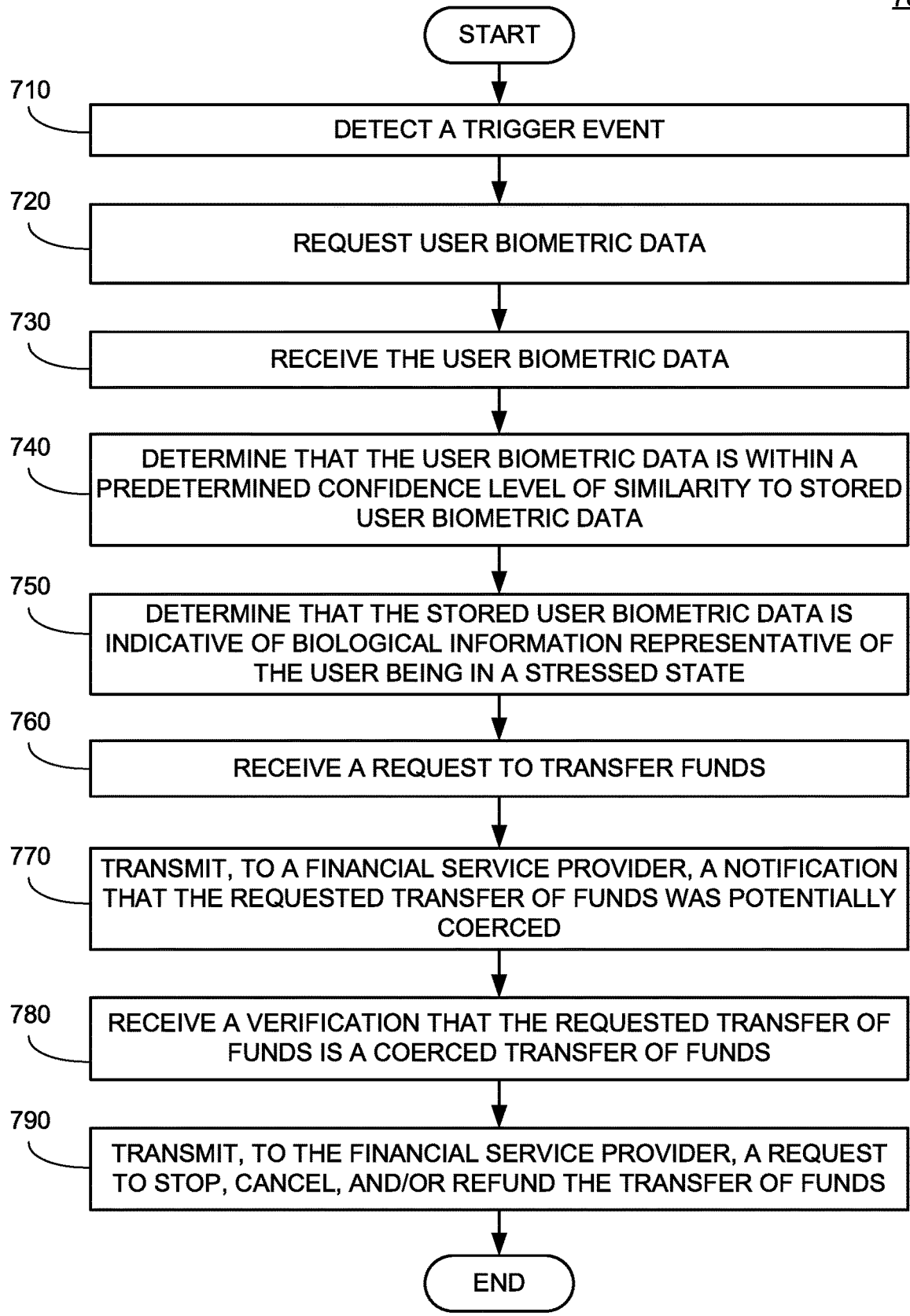
FIG. 7 is a flowchart showing operation of an example coercion detection system, in accordance with some embodiments.

FIG. 7 shows a flowchart of a method 600 for determining whether a user is being coerced to transfer funds. Method 700 may be performed by some or all of wearable user device 102, user computing device 104, web server 110, transaction server 112, biometrics authentication device 114, biometrics database 116, and third-party server 120, or any useful combination thereof.

In block 710, method 700 may include detecting a trigger event. In some embodiments, a trigger event may include any event or action as described herein. In block 720, method 700 may include requesting user biometric data. In some embodiments, requesting user biometric data may include transmitting a request for user biometric data to a device, such as wearable user device 102 and/or user computing device 104. In some embodiments, requesting user biometric data may include transmitting a request for user biometric data to a first device such that user biometric data may be measured or otherwise gathered by a second device. For example, in some embodiments, method 700 may include transmitting, to user computing device 104, a response to for user biometric data, such that user computing device 104 can forward the request to wearable user computing device 102. In block 730, method 700 may include receiving the requested user biometric data. In certain embodiments, the requested user biometric data may be received from the same device to which the request was transmitted, and in some embodiments, the requested biometric data may be received from a different that is different than the device to which the request was transmitted.

In block 740, method 700 may include determining that the received user biometric data is within a predetermined confidence threshold of similarity to stored user biometric data. In some embodiments, the stored user biometric data may be indicative of a user being in a stressed state. In some embodiments, the stored user biometric data may be indicative of the user being in a calm state. In certain embodiments, the stored user biometric data may include data that is indicative of the user being in a stressed state and other data that is indicative of the user being in a calm state. In some embodiments, determining whether the received user biometric data is within a predetermined confidence threshold of similarity to stored biometric data may include comparing the received user biometric data to the stored user biometric data, and based on that comparison, method 700 may include determining a level of similarity. In some embodiments, determining a level of similarity may include determining whether a stress value associated with the received user biometric data is within a range of stress values that are derived from the stored user biometric data. In some embodiments, determining a level of similarity may include determining a stress value associated with the received user biometric data, comparing that stress value to a stress value associated with the stored user biometric data, and determining whether the stress value associated with the received user biometric data is within a predetermined range of the stress value associated with the stored user biometric data. For example, method 700 may include determining whether the whether the stress value associated with the received user biometric data is in a range of values that are between 80% and 120% of the stress value associated with the stored user biometric data. In block 750, method 700 may include determining, based on the determination that the user biometric data is within a predetermined confidence threshold of similarity to stored user biometric data, that the stored user biometric data is indicative of biological information representative of the user being in a stressed state.

In block 760, method 700 may include receiving a request to transfer funds. For example, in some embodiments, method 700 may include receiving, from a user and via wearable user device 102 or user computing device 104, a request to transfer funds from a financial account associated with the user to another financial account. In block 770, method 700 may include transmitting, to a financial service provider, a notification that the requested transfer of funds was potentially coerced. In some embodiments, the financial service provider may be associated with a recipient account associated with the requested transfer of funds. In certain embodiments, the notification that the requested transfer of funds was potentially coerced may be transmitted integrally with, simultaneously with, or separate from the request to transfer funds.

In block 770, method 700 may include receiving a verification that the requested transfer of funds is a coerced transfer of funds. In some embodiments, the verification is received from the user, such as from the user and via wearable user device 102 or user computing device 104. In certain embodiments, receiving the verification may occur subsequent to transmitting the notification to the financial service provider. In some embodiments, prior to receiving the verification, method 700 may include transmitting a request for verification that the that the requested transfer of funds is a coerced transfer of funds, and in some embodiments, the request for verification may be sent to wearable user device 102, user computing device 104, or some other device.

In block 780, method 700 may include transmitting, to the financial service provider, a request to stop, cancel, and/or refund, to a financial account associated with the user, the transfer of funds. In certain embodiments, method 700 may include determining whether the received verification indicates that the requested transfer is a coerced transfer of funds or whether the received verification indicates that the requested transfer is not a coerced transfer of funds. In some embodiments, responsive to determining that the requested transfer is not a coerced transfer of funds, method 700 may include no further action. In some embodiments, responsive to determining that the requested transfer is not a coerced transfer of funds, method 700 may include transmitting, to the financial service provider, a second notification indicating that the requested transfer of funds is not a coerced transfer of funds. In certain embodiments, method 700 may include transmitting, to the financial service provider, the request to stop, cancel, and/or refund the transfer of funds in response to determining that the requested transfer is a coerced transfer of funds.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. As digital transfers of funds become increasingly ubiquitous, there may be a corresponding decrease usage of physical currency and thus a decrease in the likelihood that a given person will be carrying physical currency. In light of this, a first person (e.g., a mugger) attempting to coerce, steal, or otherwise take money from a second person may force or coerce the second person to digitally transfer funds from an account associated with the second person to an account associated with, or accessible by, the first person, for example, under threat of physical force or nonphysical threats such as blackmail. Thus, it may be useful to institute measures to identify situations in which a coerced transfer of funds is occurring or about to occur, as well as measures to rectify or correct such a coerced transfer of funds that has already occurred.

The system (e.g., system 100) can measure biometric data associated with a user and stores that biometric data as stored user biometric data. The stored user biometric data can include biometric data indicative of the user being in a stressed state, biometric data indicative of the user being in a calm state, or some combination of the two.

A user may use a banking application on a mobile device (e.g., user computing device 104) to transfer funds, and a trigger event can occur when a user opens the banking application. Alternately or in addition, a trigger event can occur when a user enters a particular area, enters a particular area during a particular range of time, initiates a transfer of funds within the banking application, initiates a transfer of funds (regardless of the device being used or whether a device is used at all), or initiates a transfer of funds above a threshold amount of funds. One or more devices (e.g., wearable user device 102, user computing device 104, transaction server 112, biometrics authentication device 114) can detect a trigger event by receiving data from one or more sensors (e.g., location data received from a GLS of wearable user device 102 or user computing device 104), by receiving certain input from a user (e.g., receiving instructions to open a mobile banking application installed on wearable user device 102 or user computing device 104). In response to detecting a trigger event, the system—whether by some mobile device (e.g., user computing device 104), wearable device (e.g., wearable user device 102), or some backend computing device (e.g., transaction server 112, biometrics authentication device 114)—can request user biometric data, which may be measured by one or more sensors of a device (e.g., user computing device 104) or wearable device (e.g., wearable user device 102) associated with the user. The user biometric data may be transmitted from the device measuring the biometric data (e.g., wearable user device 102, user computing device 104) to another device for evaluation (e.g., user computing device 104, biometrics authentication device 114). As the user biometric data is measured, it may be compared in real-time or near real-time to the stored user biometric data. The user biometric data can be compared to the stored user biometric data (by any capable device, such as wearable user device 102, user computing device 104, and/or biometrics authentication device 114) to determine a level of similarity of the user biometric data to the stored user biometric data. Depending on this comparison, the system can determine if the user biometric data is indicative of the user being in a stressed state. If the system determines that the user biometric data is not indicative of the user being in a stressed state, the system may perform no further action. If the system determines that the user biometric data is indicative of the user being in a stressed state, the system may perform additional actions, such as those detailed below.

The system can receive a request to transfer funds, and if the system determined that the user biometric data is indicative of the user being in a stressed state, the system can transmit, to a financial service provider associated with the receiving account of the transfer of funds, a notification indicating that the requested transfer of funds was potentially coerced. The system can receive confirmation regarding whether the transfer of funds was coerced or not. If the transfer of funds was not coerced, the system can transmit a notification to the financial service provider indicating that the transfer of funds was not coerced. If the transfer of funds was coerced, the system can transmit, to the financial service provider, a request to stop, cancel, and/or refund the transfer of funds. Alternately or in addition, if the transfer of funds was coerced, the system can transmit, to a law enforcement organization, a notification indicating that a transfer of funds has been coerced and a last-known location of the user. Alternately or in addition, the system may transmit, to the law enforcement organization, a location of the user when the coerced transfer of funds transpired, a time or range of time during which the coerced transfer of funds transpired, and information regarding the receiving account of the coerced transfer of funds. Alternately or in addition, the system may perform other precautionary safety measures, such as those described herein.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

We claim:

1. A system comprising non-transitory computer-readable medium storing instructions that, when executed by one or more processors, cause the system to:
    receive, from one or more biometric sensors of a user device, user-specific baseline stress data and user-specific baseline calm data, the user-specific baseline stress data being representative of biological information of a user being in a stressed state and the user-specific baseline calm data being representative of biological information of the user being in a calm state;
    receive situational data from one or more biometric sensors including biological information associated with the user in response to detecting a trigger event associated with a potential transfer of funds;
    responsive to determining that the received situational data is above a predetermined level of similarity to the user-specific baseline stress data, determine that a suspicious transaction is occurring; and
    initiate one or more precautionary safety measures, the one or more precautionary safety measures comprising transmitting, to at least one of a camera and a microphone, instructions to begin recording; and confirm whether the suspicious transaction was a coerced transaction by:
    transmitting a request for a confirmation of safety of the user for verification of whether a requested transfer of funds was coerced, the verification comprising user recitation of a security phrase;
    receiving a received security phrase provided by the user and recorded by a microphone;
    saving, via memory associated with the one or more processors, the received security phrase as recorded security data;
    responsive to the recorded security data being determined to be within a predetermined level of similarity to stored voice data associated with a predetermined security phrase, determining that the requested transfer of funds is a voluntary transfer of funds, and
    responsive to the recorded security data being determined to be outside the predetermined level of similarity to the stored voice data, determining that the requested transfer of funds is a coerced transfer of funds.

2. The system of claim 1, wherein initiating the one or more precautionary safety measures comprises, responsive to determining that the received situational data is above a predetermined level of similarity to the user-specific baseline stress data, determining that subsequently received situational data is above a predetermined level of similarity to of the user-specific baseline calm data.

3. The system of claim 1, wherein initiating the one or more precautionary safety measures further comprises, responsive to determining that the subsequently received situational data is above a predetermined level of similarity to the user-specific baseline stress data for a predetermined amount of time, transmit, to a law enforcement organization, a notification including a last-known location of the user.

4. The system of claim 1, wherein the user-specific baseline stress data, the user-specific baseline calm data, or both, comprises heart rate data, blood pressure data, brainwave signal data, respiratory rate data, orbody temperature data, or combinations thereof.

5. The system of claim 1, wherein the trigger event comprises a request from the user to transfer funds above a predetermined threshold.

6. The system of claim 1, wherein the trigger event comprises a request from the user to transfer funds to a new recipient.

7. The system of claim 1, wherein the instructions, when executed by the one or more processors, further cause the system to:
   determine, by the one or more processors and via a geolocational sensor of the system, a current location of the user; and
   determine whether the current location of the user is associated with an area having a crime rate that is above a predetermined threshold;
   wherein the trigger event is based at least in part on a determination that the current location of the user is associated with the area having the crime rate that is above the predetermined threshold.

8. The system of claim 1, wherein the trigger event comprises a request from the user to transfer funds during a high-risk time, the high-risk time being a predetermined time of day that is indicative of a time at which the user is unlikely to transfer funds.

9. The system of claim 1, wherein the trigger event comprises a request from the user to transfer funds to an account associated with a known criminal.

10. The system of claim 1, wherein the one or more precautionary safety measures comprises an action selected from:
    denying a requested transfer of funds;
    transmitting, to a financial service provider server, instructions to deny the requested transfer of funds; or
    transmitting, to a financial service provider server, instructions to freeze a financial account associated with the user.

11. The system of claim 1, wherein the one or more precautionary safety measures includes transmitting, to an emergency contact, a notification indicating that the user is involved in a potentially dangerous situation.

12. The system of claim 1, wherein the one or more precautionary safety measures comprises a first tier of precautionary safety measures and a second tier of precautionary safety measures, the first tier of precautionary safety measures corresponding to a low risk rating associated with the trigger event and the second tier of precautionary safety measures corresponding to a high risk rating associated with the trigger event;
    wherein the instructions, when executed by the one or more processors, further cause the system to determine a risk rating associated with the trigger event;
    wherein initiating one or more precautionary safety measures includes:
       responsive to determining, based at least in part on the risk rating, that the trigger event corresponds to the first tier of precautionary safety measures, initiating one or more precautionary safety measures of the first tier of precautionary safety measures; and
       responsive to determining, based at least in part on the risk rating, that the trigger event corresponds to the second tier of precautionary safety measures, initiating one or more precautionary safety measures of the second tier of precautionary safety measures.

13. The system of claim 8, wherein the high-risk time is configurable by the user.

14. The system of claim 1, wherein:
    the user-specific baseline stress data comprises a plurality of types of biometric data,
    the situational data comprises a plurality of types of biometric data, each type of the plurality of types biometric data of the situational data corresponding to a respective type of the plurality of types biometric data of the user-specific baseline stress data, and
    determining that the received situational data is above a predetermined level of similarity to the user-specific baseline stress data comprises determining that a majority of the plurality of types of biometric data of the situational data is above a predetermined level of similarity to the corresponding types of the plurality of types of biometric data of the user-specific baseline stress data.

15. The system of claim 1, wherein the instructions, when executed by the one or more processors, further cause the system to:
    responsive to determining that the situational data is above a predetermined level of similarity to the user-specific baseline stress data, transmit, to a user device associated with the user, instructions to engage at least one component selected from a camera and a microphone associated with the user device to record environmental data;
    receiving, from the user device, recorded environmental data; and
    analyzing the recorded environmental data to verify that the trigger event corresponds to a coerced transfer of funds.

16. The system of claim 14, wherein the instructions, when executed by the one or more processors, further cause the system to:
    responsive to verifying that the trigger event corresponds to a coerced transfer of funds, transmit the recorded environmental data to a security personnel device for confirming the user is in a potentially dangerous situation or is being coerced to transfer funds.

17. The system of claim 1, wherein initiating the one or more precautionary safety measures comprises transmitting, responsive to determining that the received situational data is above the predetermined level of similarity to the user-specific baseline stress data, an artificial confirmation notification indicating that the requested transfer of funds has successfully resulted in funds deposited in a receiving account associated with the requested transfer of funds, wherein the system has not initiated the requested transfer of funds when the artificial confirmation notification is transmitted;
    wherein the instructions, when executed by the one or more processors, further cause the system to:
       responsive to receiving verification that the requested transfer of funds was not coerced, initiating the requested transfer of funds.

18. A system comprising non-transitory computer-readable medium storing instructions that, when executed by one or more processors, cause the system to:
    receive user-specific stress data and user-specific calm data from one or more biometric sensors, the user-specific stress data including individualized biological information of a specific user being in a stressed state and the user-specific calm data including individualized biological information of the specific user being in a calm state;

receive situational data from the one or more biometric sensors in response to detecting a trigger event associated with a potential transfer of funds, the situational data including biological information associated with the specific user and obtained by the one or more biometric sensors after detection of the trigger event;

responsive to determining that the situational data is above a predetermined level of similarity to the user-specific stress data, determine that a suspicious transaction is occurring;

initiate one or more precautionary safety measures, the one or more precautionary safety measures comprising transmitting, to at least one of a camera and a microphone, instructions to begin recording; and confirm whether the suspicious transaction was a coerced transaction by:

transmitting a request for confirmation of safety of the specific user to a device associated with the specific user, the request asking the user to recite a security phrase to verify whether a requested transfer of funds was coerced;

receiving, from the device, a received security phrase provided by the user and recorded by a microphone of the device;

saving, via memory associated with the one or more processors, the received security phrase as recorded security data; and responsive to the recorded security data being determined to be outside the predetermined level of similarity to stored voice data, determining that the requested transfer of funds is a coerced transfer of funds.

19. A method comprising:

receiving user-specific stress data and user-specific calm data from one or more biometric sensors, the user-specific stress data including individualized biological information of a specific user being in a stressed state and the user-specific calm data including individualized biological information of the specific user being in a calm state;

receiving situational data from the one or more biometric sensors in response to detecting a trigger event associated with a potential transfer of funds, the situational data including biological information associated with the specific user and obtained by the one or more biometric sensors after detection of the trigger event;

responsive to determining that the situational data is above a predetermined level of similarity to the user-specific stress data, determine that a suspicious transaction is occurring;

initiating one or more precautionary safety measures, the one or more precautionary safety measures comprising transmitting, to at least one of a camera and a microphone, instructions to begin recording; and confirming whether the suspicious transaction was a coerced transaction by:

transmitting a request for confirmation of safety of the specific user to a device associated with the specific user, the request asking the user to recite a security phrase to verify whether a requested transfer of funds was coerced;

receiving, from the device, a received security phrase provided by the user and recorded by a microphone of the device;

saving the received security phrase as recorded security data; and responsive to the recorded security data being determined to be outside the predetermined level of similarity to stored voice data, determining that the requested transfer of funds is a coerced transfer of funds.

\* \* \* \* \*